US006227612B1

(12) United States Patent
Stolle et al.

(10) Patent No.: US 6,227,612 B1
(45) **Date of Patent: *May 8, 2001**

(54) OPERATIONAL ARRANGEMENT FOR MOVABLE PARTS ON VEHICLES

(75) Inventors: Klaus Stolle, Schwabniederhofen; Gerhard Huber, Frankenhofen-Kaltental; Bernd Hollerbach, Steingaden-Urspring, all of (DE)

(73) Assignee: Hoerbiger Hydraulik GbmH, Schongau (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,119

(22) Filed: Nov. 20, 1998

(30) Foreign Application Priority Data

Nov. 20, 1997 (AT) .................................................. 1968/97

(51) Int. Cl.[7] .................................. B60J 7/00; B60J 5/02

(52) U.S. Cl. ................. 296/208; 296/146.8; 296/146.12; 296/107.08

(58) Field of Search ............................. 296/146.8, 107.8, 296/146.12, 56, 223, 216.02

(56) References Cited

U.S. PATENT DOCUMENTS 2,542,605 * 2/1951 Werner ............................ 296/146.12
3,347,592 * 10/1967 Renneker ........................ 296/107.08
3,713,472 * 1/1973 Dozois ............................. 296/146.8
3,758,990 * 9/1973 Balanos .......................... 296/146.12
4,156,523 * 5/1979 Bauer ............................... 296/146.8
4,620,743 * 11/1986 Eke .................................. 296/146.8
4,679,841 * 7/1987 Taunay ............................. 296/146.8
4,773,126 * 9/1988 Voss ............................... 296/146.12
4,880,267 * 11/1989 Ohya ................................ 296/146.8
5,033,789 * 7/1991 Hayashi et al. ................. 296/107.08
5,069,499 * 12/1991 Burst et al. ....................... 296/146.8
5,435,406 * 7/1995 Gaffoglio et al. .............. 296/146.12
5,806,622 * 9/1998 Murphy ............................ 296/146.8
5,851,049 * 12/1998 Squire et al. ..................... 296/146.8
5,865,497 * 2/1999 Klein et al. ....................... 296/146.8
5,921,613 * 7/1999 Breunig et al. ................. 296/146.12

FOREIGN PATENT DOCUMENTS 4141820 6/1993 (DE) .
002696704 * 4/1994 (FR) ................................. 296/146.8
002700504 * 7/1994 (FR) ................................. 296/146.8
002703005 * 9/1994 (FR) ................................. 296/146.8
406144013 * 5/1994 (JP) .................................. 296/146.8

* cited by examiner

*Primary Examiner*—Joseph D. Pape
*Assistant Examiner*—Kiran B. Patel
(74) *Attorney, Agent, or Firm*—Dykema Gossett PLLC

(57) ABSTRACT

The invention relates to an operational arrangement for movable parts on vehicles, especially for hatches, movable roofs and the like. The invention provides for the automatic opening of the hatch or roof by a drive unit. The invention is characterized by placement of a drive mechanism within the vehicle, obviating the need for special coating of the drive mechanism, with transfer of forces from the interior to the exterior of the vehicle through a four joint hinge including a pivot pin which passes through the body of the vehicle and is operatively connected to the drive mechanism and the movable part.

11 Claims, 4 Drawing Sheets

OPERATIONAL ARRANGEMENT FOR MOVABLE PARTS ON VEHICLES

FIELD OF THE INVENTION

The invention relates to an operational arrangement for movable parts on vehicles and, more particularly, to an arrangement for hingedly attaching rear hatches, movable roofs and the like to vehicles.

BACKGROUND OF THE INVENTION

Movable parts on a vehicle, especially rear hatches, are connected via hinges, and in many cases via hinges with four joints, to the body of the vehicle. In most cases, there is a spring on each hinge which supports some of the weight of the moving part and dampens the movement of the hatch. In automatically operated rear hatches, or similarly constructed parts, it is the state of the art to replace one of these springs with a drive unit for opening and closing of the hatch, preferably using a hydraulic cylinder. This arrangement is ill balanced and strains the hatch, and also has the significant disadvantage that the pressure conduits must pass through the rain gutter and that the cylinder itself needs protection for the surface thereof. Moreover, the hinge which includes the drive arrangement must be of a different design than the non-driven hinges. State of the art is also a construction in which one of the hinge levers is made to extend directly inward into the interior of the vehicle where a drive means is connected to it. This design has, however, the disadvantage that the passageway through which the hinge lever extends is difficult to insulate, since the insulation should occur throughout the large path of the lever over a large area. For this reason, this known solution has not been successful.

Therefore, it is an object of the present invention to create an arrangement which combines optimal drive device protection with a simple design and good, problem-free operation of the part to be moved.

SUMMARY OF THE INVENTION

This problem is solved using an operational arrangement, as mentioned above, characterized in that an inner lever of the hinge is connected to the outer lever of the hinge via a pivot pin, which pivot pin passes through the body of the vehicle. Such a pivot pin arrangement is very effective for the transfer of torque, and allows for good insulation and mechanical stabilization. The drive arrangement, as well as its junction point with the hinge is optimally protected from corrosive media when located in the interior of the vehicle and no longer in the rain gutter. This minimizes the danger of penetration of water, corrosive media, or dirt. Therefore, no special surface preparation is necessary. Also, no hydraulic lines need to pass through the rain gutter or through the body of the vehicle, which simplifies production. The design parameters of the drive arrangement, for example, stroke, diameter, working pressure, etc., in a hydraulic cylinder, are no longer limited by geometric conditions in the outer area of the hinge. Also, hinge kinematics do not need to be changed. Instead, the drive can be freely adjusted to fit the system. Of course, when the drive device is turned off, a purely manual operation of the part to be moved can occur. Since the drive arrangement is not located in the outer area of the hinge, springs can be arranged on both sides to absorb the weight of the vehicle part on both sides, and in so doing, avoid one-sided strain.

The hinge is a multi-jointed hinge, especially a four-jointed hinge in which one of the hinge joints near the vehicle, preferably the one located nearest to the center of the vehicle is connected via the pivot pin with an inner lever. This combination of characteristics offers good hinge kinematics with optimal opening of the rear hatch or of another vehicle part in combination with a connection of the drive device to the hinge that has a simple stable construction.

The drive device is a working cylinder, preferably a hydraulic working cylinder. This choice of drive device allows for an exact operation of the rear hatch or the like using simple proven systems.

To greatly simplify the system structurally, the working cylinder has its piston rod pivotally connected to the inner lever of the hinge, and the cylinder is pivotally connected with a part of the hinge closer to the vehicle. In so doing, a hinge joint is used for pivotally supporting the end of the working cylinder, and an additional junction point requiring additional construction can be avoided. It will often be advantageous to use the otherwise necessary pivot point of the hinge joint located near the vehicle also as a pivot point for the working cylinder, and thus further avoid construction and production efforts.

In order to absorb the strong bending forces that occur on the pivot pin of the hinge or the drive device during the automatic operation of the vehicle part, a further characteristic of the invention provides, between the pivot pin and a further vehicle-tight point, preferably between the pivot pin and the vehicle-tight pivot point of the drive device, a pull-resistant, pressure-resistant, preferably also bend-resistant connection. In doing so, a mechanical over-exertion of the pivot pin can be prevented without hindering the turn and tilt motions of the hinge. With hinges having four joints, the vehicle-tight pivot point of the drive device coincides advantageously with a second hinge joint that allows for a very simple construction making use of available pivot points.

Especially for rear hatch and movable roofs, in order to maintain optimal kinematics and to achieve the best possible protection of the drive device, the pivot pin of the hinge extends from the interior of the vehicle into the rain gutter of the rear hatch or of the movable roof, and the drive device and the inner lever are located in the trunk or storage area of the roof.

In the following description, the invention will be described using, as an example, an embodiment illustrated in the attached figures.

DETAILED DESCRIPTION OF THE INVENTION

Figure 2:
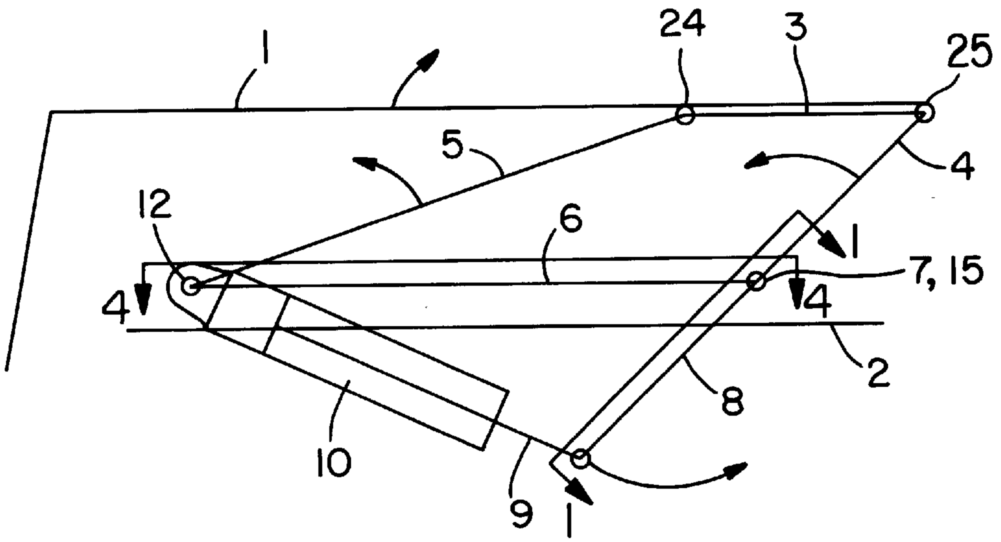
FIG. 2 shows schematically a first embodiment of an operational arrangement according to the invention with a hinge having four joints.

In FIG. 2, it is illustrated schematically how, for example, a rear hatch or trunk cover 1 of a vehicle is connected to its body, preferably in the area of its rain gutter 2, via a four-joint hinge 12, 15, 24, and 25 as an example of a multi-joint hinge. In so doing, the rear hatch 1 is attached to the hinge top part 3 with its pivot points 24 and 25 distant from the vehicle. The hinge bottom part 6 and the pivot points 7, 12 near the vehicle are placed preferably (as is seen better in FIG. 4) at the side wall 2*a* of the rain gutter 2. The tilting motion for the opening and closing of the rear hatch 1 is caused by the difference in length of first and second outer hinge levers, 4 and 5 respectively, during their tilting (hinge lever 5 is longer in length that hinge lever 4).

According to the invention, one of the hinge levers 4, 5, preferably hinge lever 4 which is closer to the longitudinal center of the vehicle, is connected via a pivot pin 15 to an inner lever 8 located in an interior space 19*a* of the vehicle onto which inner lever 8 the piston rod 9 of a hydraulic cylinder 10 also located in the interior space 19*a*, used as a driver device is pivotally connected. To open the rear hatch, the piston rod 9 is extended and the inner lever 8 is tilted in the a counter-clockwise direction. The torque is transferred via the pivot pin 15 to the hinge lever 4, and also via the hinge connection to hinge lever 5. In so doing, the hinge top part 3 is tilted in a clockwise direction and, at the same time, slightly lifted so that the rear hatch 1 is brought into a open position. The closing motion is caused by inward movement of the piston rod 9 into the working cylinder 10 to move the components in the opposite direction. For manual operation of the rear hatch 1 or the like, the drive device, which here is the working cylinder 10, is depressurized.

Figure 3:
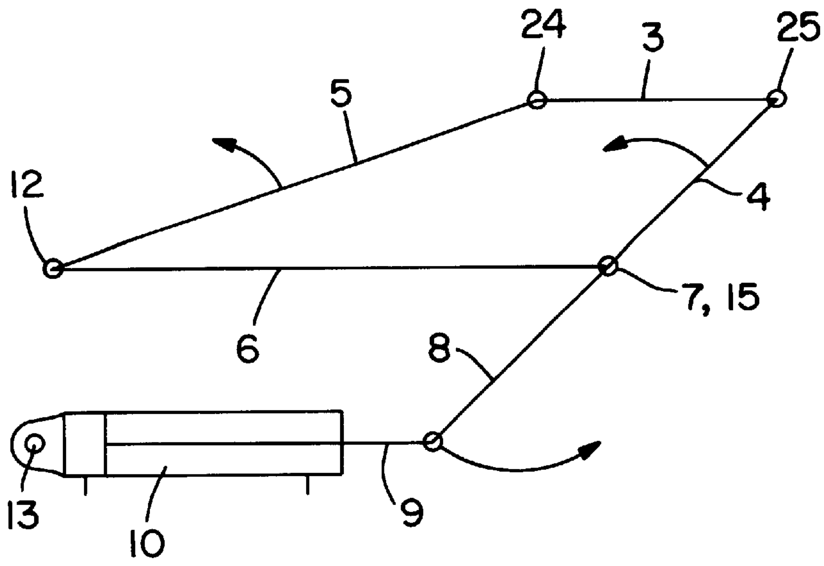
FIG. 3 shows another embodiment again with a hinge having four joints.

In the embodiment illustrated in FIG. 2, the working cylinder 10 is pivotally connected to the second pivot point 12, close to the vehicle. It is also possible, however, to pivotally connect the cylinder 10, via an axis parallel to the axes of the four-joint hinge 12, 15, 24 and 25 a vehicle-tight point 13 outside of the area of the four-joint hinge 12, 15, 24 and 25 as shown schematically in FIG. 3. In any case, the cylinder 10 can be protected from corrosive media, humidity and dirt by being located in the interior of the vehicle, as in the trunk. Also, no pressure conduits have to pass through the rain gutter 2 for the pressure device. Consequently, these gutters can be made smaller.

Figure 4:
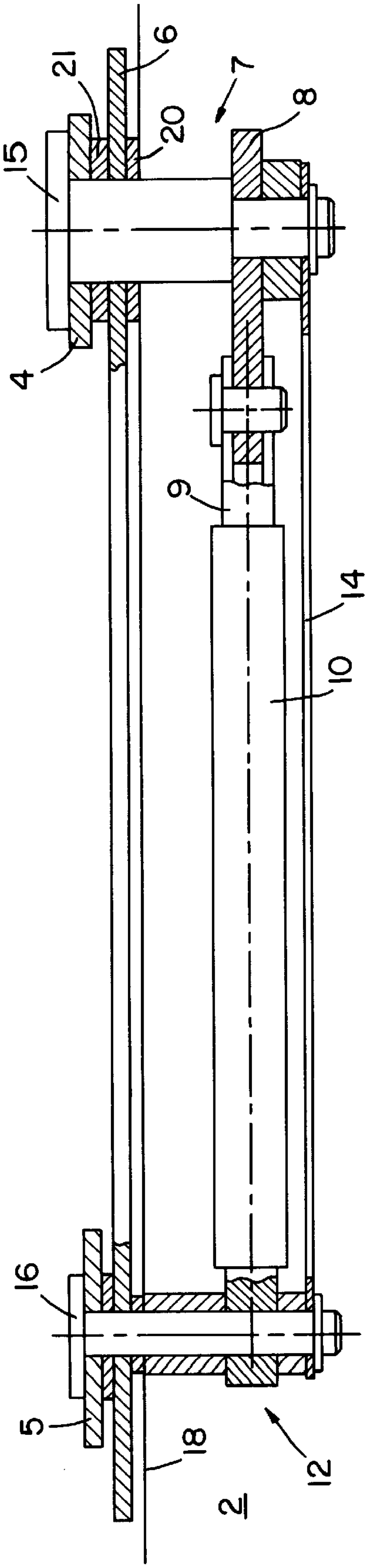
FIG. 4 is taken along line 4—4 of FIG. 2 and is partially broken away to show a top view, and a partial cross-section, of the operational arrangement shown in FIG. 2 with a stabilizing connection.

Since the weight of the rear hatch 1 is not unsubstantial and the pivot pin 15, the cylinder 10 and the piston rod 9 are therefore, during the opening at the beginning of the motion and during closing at the end of the motion, subjected to strong bending forces, one embodiment includes a pull-resistant and pressure-resistant connection 14, preferably also bend-resistant, which serves as a stabilizer as shown in FIG. 4. The connection 14 is, for example, a rectangular profile bar that is inserted between pivot joints 7 and 12 of the four-joint hinge. Connection 14 is connected to the side of the pivot pins 15, 16, forming the pivot axes, which is disposed within the body of the vehicle. Advantageously, the connection 14 is inserted between the pivot point of the working cylinder 10 at the body of the vehicle and pivot point 7, irrespective of where the said pivot point of the working cylinder is located (at pivot point 12 as shown, or at a part of the hinge that is near the vehicle, directly on the body of the vehicle outside of the hinge, etc.).

Figure 1:
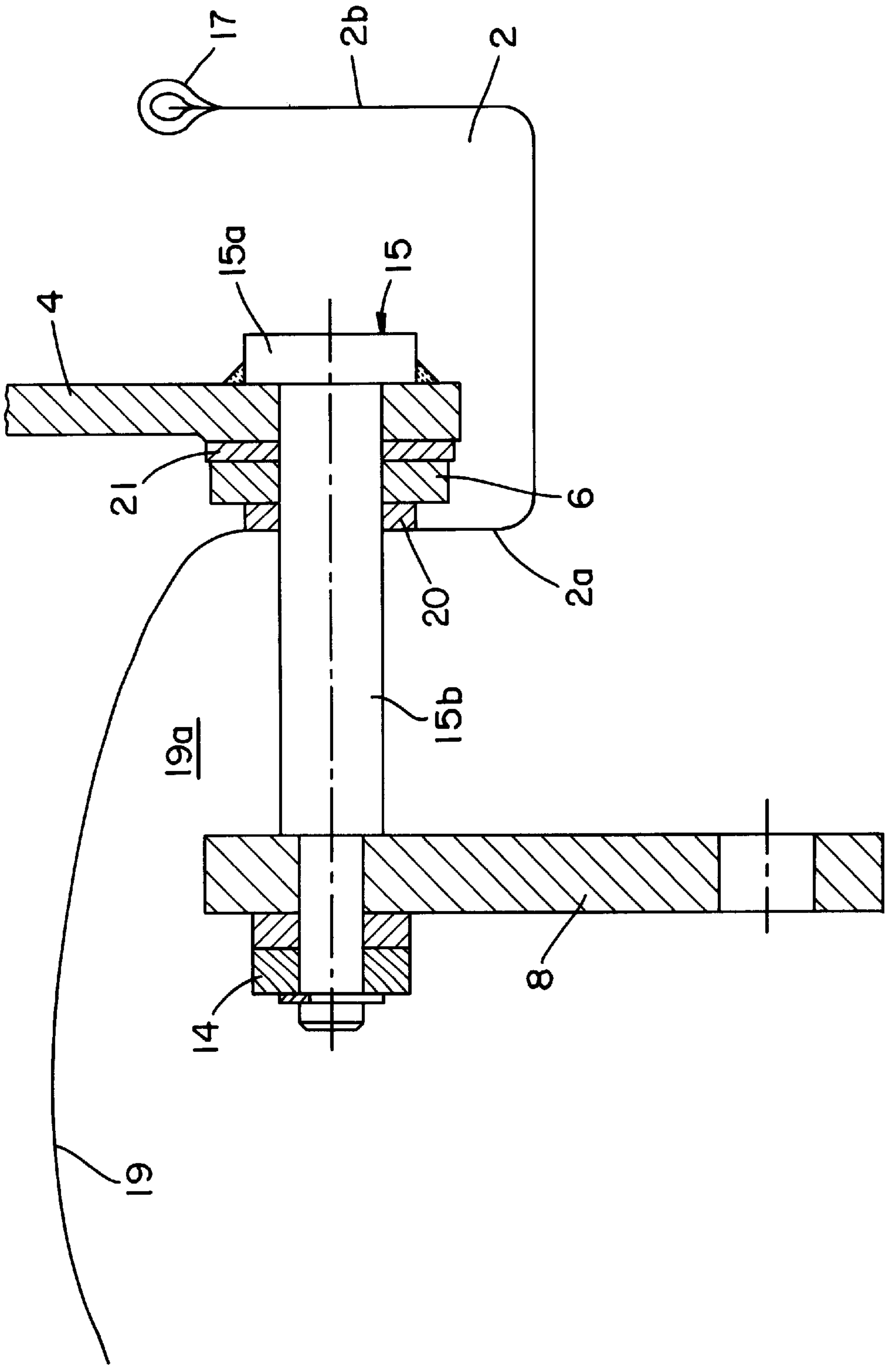
FIG. 1 shows is taken along line 1—1 of FIG. 2 and in cross-section the location where the pivot pin passes through the body of the vehicle.

FIG. 1 illustrates a cross-section through the arrangement in the area where a shaft 15*b* of the pivot pin 15, whose head 15*a* is located in the rain gutter 2, passes through the body of the vehicle. The inner edge of the rain gutter 2 is closed off using a rubber seal 17 located at the top of side wall 2*b* and the side 18 of the rain gutter 2, through which the pin 15 passes, joins with the curvature 19 of the fender. On the far left or inner end of the pivot pin 15 as seen in FIG. 1, the inner lever 8 is torsionally fixed to the pivot pin. Beyond inner lever 8, a spacer sleeve, the connection 14, and at least one stop element may be provided. Directly at the side 18 of the rain gutter 2 is a spacer and sealing element 20 to which the hinge bottom part 6 is attached. There is another spacer disc 21 between hinge bottom part 6 and the hinge lever 4 which is torsionally fixed to the outer end of pivot pin 15. This transfer of the torque from the inner lever 8 to the outer hinge lever 4 via the pivot pin 15 is especially effective and structurally simple to realize. The torsionally fixed connections of the inner lever 8 and the hinge lever 4 with opposite ends of the pivot pin 15 can be realized via a frictional or form-fit connection.

The vehicle includes a body including portions 19, 2*a*, 2*b* which define a vehicle interior and a vehicle exterior in a conventional manner. The four-joint hinge includes an inner lever 8 disposed within the vehicle interior 9*a* (see FIG. 5) and outer levers 4, 5 and 6 which are disposed at the vehicle exterior, lever 3 of the hinge being connected to the rear hatch of the vehicle. The working cylinder or drive device 10 is disposed within the vehicle interior and is pivotally supported at pivot point 12 by pin 16, while the piston rod 9 is pivotally connected to one end of inner lever 8. The opposite end of lever 8 is torsionally fixed to the inner end of pivot pin 15, while the outer end of pivot pin 15 is torsionally fixed to outer lever 4 for transmitting torque from lever 8 to lever 4 through pivot pin 15. Stabilizer bar 14 is connected between pivot pins 15 and 16. The drive device 10 may be disposed within the trunk or roof storage area of the vehicle.

Figure 5:
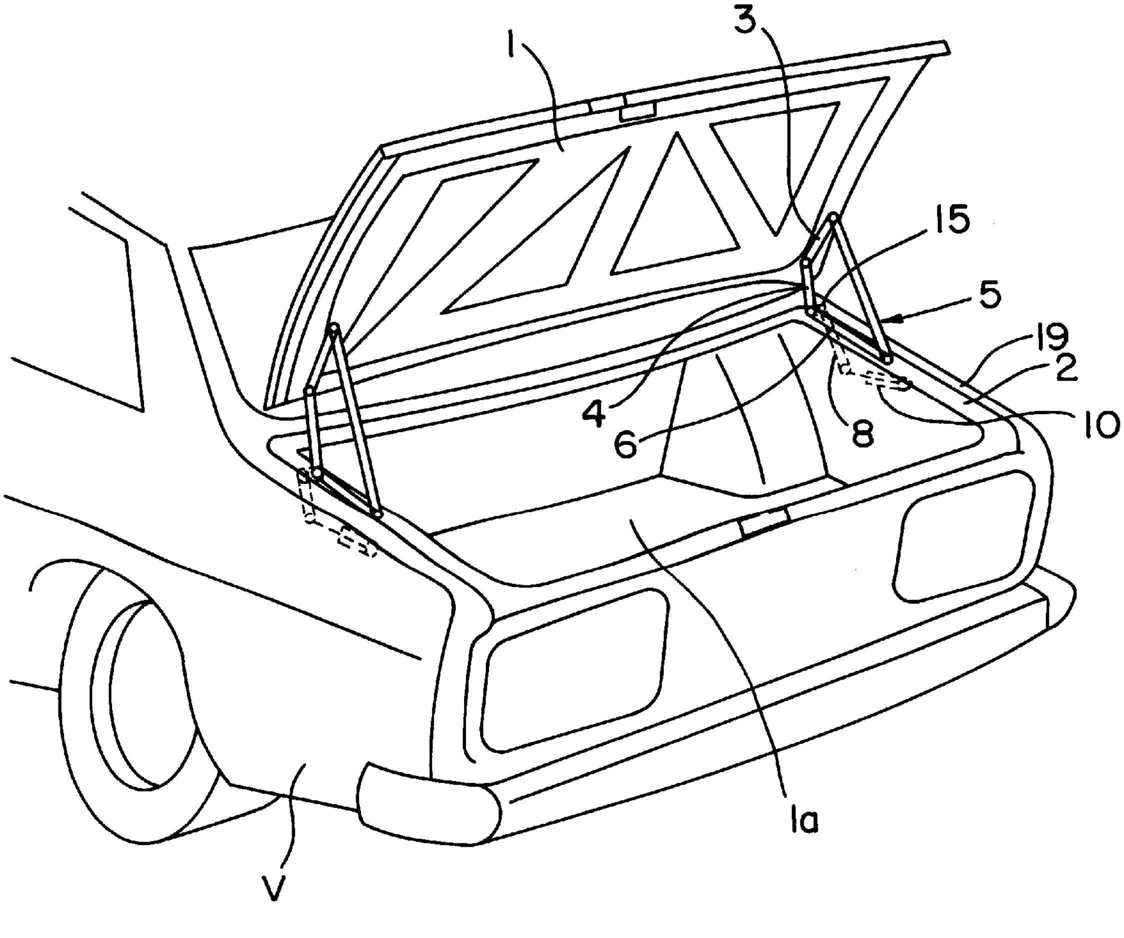
FIG. 5 shows an embodiment of the invention wherein the inventive hydraulic operational arrangement is used to move a trunk cover relative to a trunk area of a vehicle.

FIG. 5 shows the hydraulic operational arrangement of the invention attached to a trunk cover 1 so as open or close a trunk area 1*a* of a vehicle V.

The invention has been described with reference to a preferred embodiment. Obviously, various modifications, alterations, and other embodiments will occur to others upon reading and understanding this specification. It is our intention to include all such modifications, alterations, and alternate embodiments insofar as they come within the scope of the appended claims, or the equivalent thereof.

We claim:

1. The combination of (a) a vehicle that includes a vehicle body defining an interior space and a vehicle covering part that is movable relative to the vehicle body, and (b) a hydraulic operational arrangement for moving the vehicle covering part relative to the vehicle body, said hydraulic operational arrangement comprising a hydraulic working cylinder mounted in said interior space of said vehicle, a four-joint hinge which includes a hinge top part, a first hinge lever, a hinge bottom part and a second hinge lever, a first hinge which connects adjacent ends of said top hinge part and said first hinge lever, a second hinge connecting adjacent ends of said first hinge lever and said bottom part, and third hinge connecting adjacent ends of said bottom hinge part and said second hinge lever, and a fourth hinge connecting adjacent ends of said second hinge lever and said top hinge part, said first and fourth hinges being connected to said vehicle covering part and said third hinge including a pivot pin that extends though said vehicle body, and an inner lever located in said interior space of said vehicle and connecting said hydraulic working cylinder with said pivot pin to rotate said second hinge lever and thereby move said vehicle covering part relative to said vehicle body.

2. The combination according to claim 1, wherein said vehicle body defines a rain gutter having first and second side walls, and wherein said pivot pin extends through said first side wall of said rain gutter.

3. The combination according to claim 2, wherein said vehicle defines a trunk area, wherein said vehicle covering part is a trunk cover, and wherein said rain gutter extends along a side of said trunk area.

4. The combination according to claim 3, wherein said second side wall of said rain gutter includes a seal means for contact with said trunk cover when closed over said trunk area.

5. The combination according to claim 1, wherein said pivot pin includes a head at a first end thereof and a shaft that extends from said head to a second end thereof, said head being located in said rain gutter and said shaft extending through first side wall into said interior space.

6. The combination according to claim 5, wherein said inner lever is attached to said shaft at a location within said interior space, and wherein said second hinge lever is connected to said shaft of said pivot pin at a first location within said rain gutter.

7. The combination according to claim 6, wherein said hinge bottom part is connected to said shaft of said pivot pin at a second location within said rain gutter.

8. The combination according to claim 7, including a sealing element around said shaft between said hinge bottom part and said first side wall of said gutter.

9. The combination according to claim 1, wherein said first hinge lever is longer in length than said second hinge lever.

10. The combination according to claim 1, wherein an end of said hydraulic working cylinder is connected to said second hinge.

11. The combination according to claim 1, including a stabilizer member connected between said second and third hinges.

* * * * *